(12) United States Patent
Kupfer et al.

(10) Patent No.: US 11,597,288 B2
(45) Date of Patent: Mar. 7, 2023

(54) ENERGY SUPPLY ARRANGEMENT FOR SUPPLYING A MOTOR VEHICLE WITH ELECTRICAL ENERGY VIA A CONDUCTIVE PLUG CONNECTION AND METHOD FOR OPERATING AN ENERGY SUPPLY ARRANGEMENT

(71) Applicant: AUDI AG, Ingolstadt (DE)

(72) Inventors: Alexander Kupfer, Mannheim (DE); Ilias Gkoumas, Nuremberg (DE); Hardo Tumm, Ingolstadt (DE)

(73) Assignee: Audi AG, Ingolstadt (DE)

( * ) Notice: Subject to any disclaimer, the term of this patent is extended or adjusted under 35 U.S.C. 154(b) by 80 days.

(21) Appl. No.: 17/030,169

(22) Filed: Sep. 23, 2020

(65) Prior Publication Data
US 2021/0086633 A1 Mar. 25, 2021

(30) Foreign Application Priority Data
Sep. 25, 2019 (DE) .......................... 102019125783.2

(51) Int. Cl.
*B60L 53/16* (2019.01)
*H01R 13/453* (2006.01)
(Continued)

(52) U.S. Cl.
CPC ............... *B60L 53/16* (2019.02); *B60L 53/30* (2019.02); *B60L 53/34* (2019.02);
(Continued)

(58) Field of Classification Search
CPC .......... B60L 53/16; B60L 53/30; B60L 53/34; H01R 13/4538; H01R 24/86; H01R 2201/26
(Continued)

(56) References Cited

U.S. PATENT DOCUMENTS 3,491,326 A * 1/1970 Pfister ................ H01R 13/4538
439/141
3,980,380 A * 9/1976 Cieniawa ............... H01R 24/38
439/656
(Continued)

FOREIGN PATENT DOCUMENTS

DE 10 2011 082 092 A1 3/2013
DE 102011114321 A1 * 3/2013 .......... B60L 11/1818
(Continued)

*Primary Examiner* — Richard Isla
*Assistant Examiner* — Manuel Hernandez
(74) *Attorney, Agent, or Firm* — Seed Intellectual Property Law Group LLP (57) ABSTRACT

An energy supply arrangement for supplying a motor vehicle with electrical energy via a conductive plug connection, includes a stationary charging station and a charging socket which is arranged on board the motor vehicle, the charging station having a charging plug which can be extended in the direction of the motor vehicle. It is provided that the charging plug has a cylindrical base body, on the lateral surface of which multiple electrical contacts are arranged, the base body being encompassed by a protective ring which covers the contacts in a first position and releases the contacts in a second position for contacting counter contacts of the charging socket. A method for operating an energy supply arrangement is also provided.

9 Claims, 3 Drawing Sheets

(51) Int. Cl.
 *B60L 53/34* (2019.01)
 *B60L 53/30* (2019.01)
 *H01R 24/86* (2011.01)

(52) U.S. Cl.
 CPC ......... *H01R 13/4538* (2013.01); *H01R 24/86* (2013.01); *H01R 2201/26* (2013.01)

(58) Field of Classification Search
 USPC ......................................................... 320/109
 See application file for complete search history.

(56) References Cited

U.S. PATENT DOCUMENTS

| | | | | |
|---|---|---|---|---|
| 5,871,371 | A * | 2/1999 | Rothenberger | H01R 12/75 439/579 |
| 6,010,369 | A * | 1/2000 | Itabashi | H01R 13/025 439/930 |
| 6,273,744 | B1 * | 8/2001 | Murdock | H01R 24/00 439/252 |
| 8,313,336 | B2 * | 11/2012 | Bondo | H04R 25/556 439/324 |
| 2017/0166070 | A1 * | 6/2017 | Dunger | B60L 53/11 |
| 2019/0016218 | A1 * | 1/2019 | Haag | H02J 7/0042 |
| 2019/0288466 | A1 * | 9/2019 | Copper | H01R 13/17 |
| 2020/0269713 | A1 * | 8/2020 | Hakenberg | H01R 13/005 |

FOREIGN PATENT DOCUMENTS

| | | |
|---|---|---|
| DE | 10 2014 223 964 A1 | 5/2015 |
| DE | 10 2014 200 290 A1 | 7/2015 |
| DE | 10 2017 218 226 A1 | 9/2018 |
| DE | 10 2017 115 224 A1 | 1/2019 |
| DE | 10 2018 116 718 A1 | 1/2019 |
| EP | 3 043 421 B1 | 4/2018 |

* cited by examiner

0
ENERGY SUPPLY ARRANGEMENT FOR SUPPLYING A MOTOR VEHICLE WITH ELECTRICAL ENERGY VIA A CONDUCTIVE PLUG CONNECTION AND METHOD FOR OPERATING AN ENERGY SUPPLY ARRANGEMENT

BACKGROUND

Technical Field

Embodiments of the invention relate to an energy supply arrangement for supplying a motor vehicle with electrical energy via a conductive plug connection, with a stationary charging station and a charging socket arranged on board the motor vehicle, the charging station having a charging plug which can be extended in the direction of the motor vehicle. Embodiments of the invention further relate to a method for operating an energy supply arrangement.

Description of the Related Art

For example, the printed document DE 10 2014 200 290 A1 is known from the prior art. This printed document describes a charging device, a charging system and a method for charging a battery of a vehicle, and an electrical connection device for charging a battery of the vehicle. The electric charging device comprises: a lifting device, to which a charging head is coupled; the charging head having a first plurality of first electrical contacts at or on a first surface of the charging head, wherein at least some of the first electrical contacts can be connected to an energy source for charging the battery; and an actuator, by means of which the lifting device can be actuated in such a manner that the charging head can be moved at least partially in a first direction which is substantially perpendicular to the first surface; the lifting device also being configured such that, upon striking a stop surface in the first direction, the charging head can be moved in a second direction along the stop surface by continued actuation of the lifting device by the actuator.

Furthermore, publication DE 10 2011 082 092 A1 describes a charging device for the automated establishment and disconnection of a charging connection for a plug-in vehicle, the charging device comprising the plug-in vehicle, a charging electrical unit, a charging station and a charging cable to charge an energy storage unit of the vehicle through a wired charging connection, wherein the charging electrical unit comprises a socket and the charging cable comprises a plug, the charging device being designed such that the socket has one or more insertion funnels, that the plug has one or more insertion pins, that each insertion pin is allocated to a specific insertion funnel, that information can be exchanged between the charging station and the charging electrical unit if the charging connection is established, that information can be exchanged between the charging station and the vehicle if the charging connection is not established, that the plug and a reinforcing section of the charging cable connected to the plug through a guiding mechanism, of which the charging station is comprised, can be moved in a predefined spatial direction in the form of a coupling movement through a maximum predefined coupling length, and that the plug and a reinforcing section of the charging cable connected to the plug through a guiding mechanism, of which the charging station is comprised, can be moved in the opposite direction of the predefined spatial direction in the form of a decoupling movement over said coupling length.

BRIEF SUMMARY

An energy supply arrangement is described for supplying a motor vehicle with electrical energy via a conductive plug connection, which has advantages over known energy supply arrangements, and in particular enables the conductive plug connection to be reliably established over the long term.

According to embodiments of the invention, this is achieved with an energy supply arrangement with the features described herein. It is provided in this case that the charging plug has a cylindrical base body, on the lateral surface of which multiple electrical contacts are arranged, the base body being encompassed by a protective ring which covers the contacts in a first position and releases the contacts in a second position for contacting counter contacts of the charging socket.

The energy supply arrangement serves to supply the motor vehicle with electrical energy. The electrical energy is used, for example, to operate an energy consumer of the motor vehicle. The energy consumer can be, for example, an energy storage device of the motor vehicle, which serves the temporary storage of electrical energy. In this case, the electrical energy may be used to charge the energy storage device. The energy storage device may be in the form of a traction battery, that is to say as an energy storage device for a traction drive of the motor vehicle, by means of which a drive torque directed to driving the motor vehicle can be provided or provided at least temporarily.

The essential components of the energy supply arrangement are the stationary charging station away from the motor vehicle and the charging socket on board the motor vehicle. The charging station is connected to an energy source or current source, such as permanently. At least at times, the electrical energy provided by the energy source is transmitted to the charging socket via the charging station and, in so far, is made available to the motor vehicle via said charging socket, for example for operating the energy consumer or for charging the energy storage device.

The charging station may be substantially stationary, for example it is at least partially and/or at least temporarily accommodated in an underground on top of which the motor vehicle is arranged. The charging station and the charging socket serve to establish the conductive plug connection. In the context of the conductive plug connection, the electrical energy is transmitted continuously from the charging station to the motor vehicle or the charging socket in a conductive manner, that is to say by conducting electricity. For this purpose, the charging station has the charging plug, which can be inserted into the charging socket to establish the conductive plug connection.

The charging plug can be extended in the direction of the motor vehicle. This means that the charging plug can be arranged in at least two different positions. For example, said charging plug is arranged in a first position away from the charging socket, whereas in a second position for establishing the conductive plug connection, it abuts or engages said charging socket. In the first position, the charging plug may be completely accommodated in the underground. For example, in the first position, an upper side of the charging plug facing the motor vehicle is arranged flush with the underground and/or a cover of the charging station. This means that in its first position the charging plug does not protrude above the underground or the cover but is flush with the underground or the cover. In this way, the charging plug is reliably protected.

The charging plug has the cylindrical base body, which has an end face facing the motor vehicle—corresponding to the upper side facing the motor vehicle—and the lateral surfaces. The end face is completely encompassed by the lateral surface in the circumferential direction with respect to a longitudinal central axis of the cylindrical base body. The base body can in principle be of any cylindrical design. However, it may be circular-cylindrical, that is to say it has a round end face from which the lateral surface originates which also has a round cross section.

The charging plug has multiple electrical contacts for establishing the conductive plug connection. In at least one position of the charging plug and with a corresponding arrangement of the motor vehicle or the charging socket, the electrical contacts are in a conductive electrical connection with counter contacts of the charging socket. In this position, the conductive plug connection between the charging plug and the charging socket exists insofar as well as between the energy source and the energy consumer, such as the energy storage device, via the electrical contacts and the electrical counter contacts which are in conductive connection with the electrical contacts.

The charging plug may be locked in the charging socket. This means that the charging plug is locked after it has been inserted into the charging socket and can only be removed from the charging socket after the locking has been released. In this case, it can be provided to bias the charging plug after it has been inserted into the charging socket and has been locked therein, in the direction facing away from the charging socket. In this case, the charging plug is automatically pulled out of the charging socket as soon as the locking is released.

The electrical contacts are arranged on the lateral surface of the charging plug or the base body. There may be no electrical contacts on the end face of the charging plug, so that the electrical contacts are therefore arranged exclusively at or on the lateral surface. For example, the electrical contacts with respect to the longitudinal central axis of the base body are arranged in the circumferential direction over the circumference of the base body, in particular evenly distributed. Additionally or alternatively, it can be provided that the electrical contacts are aligned with one another in the axial direction with respect to the longitudinal central axis, are in overlap with one another, adjoin one another or are arranged at a distance from one another.

This means, in principle, any distribution of the electrical contacts on the lateral surface is permissible as long as the electrical contacts are arranged in such a way that they are in a conductive electrical connection with the electrical counter contacts after the charging plug has been arranged in the charging socket as intended. Each of the electrical contacts may be assigned at least one electrical counter contact of the charging socket, in particular exactly one electrical counter contact, and vice versa. After the charging plug has been inserted into the charging socket, each of the electrical contacts is in conductive connection with at least one of the electrical counter contacts, in particular with exactly one of the electrical counter contacts.

In order to enable the conductive plug connection to be established reliably in the long term, the base body is encompassed by the protective ring, which is arranged and/or mounted in a displaceable manner at the cylindrical base body. The protective ring can be arranged in different positions, namely at least in the first position and the second position. In the first position, the protective ring encompasses the base body in such a way that it completely covers the contacts, that is to say is in overlap with them and completely overlaps them. In the second position, on the other hand, the protective ring releases the electrical contacts so that they can make a conductive electrical connection with the counter contacts of the charging socket.

The protective ring may be designed and/or arranged or mounted on the base body in such a way that an end face of the protective ring in the first position is aligned with the end face of the base body. This means that in the first position of the charging plug described above, not only is the end face of the base body or its upper side aligned with the underground or the cover of the charging station, but, in addition, also the end face of the protective ring. This provides a reliable protection of the electrical contacts from external influences. The cover is, for example, a base plate of the charging station.

In addition, the protective ring may pass over the electrical contacts when it is displaced between the first position and the second position, or vice versa, so that the protective ring effects a cleaning of the electrical contacts. For this purpose, for example, the protective ring has a cleaning device facing the electrical contacts, in particular in the form of a cleaning brush or the like. Said cleaning device is arranged in such a way that when the protective ring is displaced between the first position and the second position or vice versa, it passes over the electrical contacts in a cleaning manner.

Before inserting the charging plug into the charging socket, it is necessary to displace the protective ring from its first position to the second position in order to enable the establishment of the conductive plug connection, that is to say the establishment of an electrical connection between the electrical contacts and the electrical counter contacts. It can be provided for the protective ring to be displaced from the first position to the second position while the charging plug is being extended, that is to say simultaneously. In this case, it can be provided for the protective ring to be displaced already at the beginning of the extension of the charging plug or at least before the charging plug reaches the charging socket.

However, the protective ring may be only displaced from the first position to its second position when the charging plug reaches the charging socket, in particular while the protective ring abuts the charging socket. In this way, contamination of the electrical contacts is prevented particularly effectively, because the abutment of the protective ring with the charging socket provides a reliable protection of the electrical contacts from external influences.

For example, it is provided to effect the displacement of the protective ring by the abutment of the protective ring with the charging socket and the simultaneous extension of the charging plug. For this purpose, the charging socket has an abutment ring for the protective ring, which encompasses a plug receptacle of the charging socket in the circumferential direction. When the charging plug is extended, the protective ring comes into abutment contact with the abutment ring. When the charging plug is extended further in the direction of the charging socket, the protective ring is forced from its first position into its second position, while at the same time the contacts are retracted into the plug receptacle. Correspondingly, the electrical contacts are always encapsulated from the surroundings by means of the protective ring. In such a configuration, there is also no need for a separate drive for displacing the protective ring, although such a drive can of course be provided, for example in the form of an electromotive or an electromagnetic actuator.

A further development provides that the charging plug can only be displaced translationally in the vertical direction by means of a lifting device. The lifting device is part of the charging station and serves to displace the charging plug in the vertical direction. The vertical direction may be understood to mean an axial direction with respect to the longitudinal central axis of the base body. The lifting device is configured in such a way that it can be used to displace the charging plug into the charging socket, so that after the displacement, the electrical contacts have been established in the plug receptacle of the charging socket and are in conductive connection with the electrical counter contacts. The displacement of the charging plug only in the vertical direction enables a particularly simple and inexpensive configuration of the charging station.

A further development provides that the charging socket can be translationally displaced in at least one spatial direction parallel to an underbody of the motor vehicle by means of a displacement device. The displacement device serves to displace the charging socket parallel to the underbody of the motor vehicle, that is to say along a straight line running parallel to the underbody or in a plane arranged parallel to the underbody. The displacement of the charging socket by means of the displacement device enables the position of the charging socket to be aligned with the position of the charging plug during a stop of the motor vehicle. The displacement device thus enables the position of the charging socket to be aligned with a position of the charging plug without the motor vehicle having to be displaced.

The charging socket may be only displaceable parallel to the underbody of the motor vehicle. The at least one spatial direction is understood to mean a direction which runs along the straight line mentioned above or lies in the imaginary plane. For example, the spatial direction runs parallel to a longitudinal axis of the motor vehicle or perpendicular to it.

The charging socket may be displaced in two perpendicular spatial directions by means of the displacement device, so that two-dimensional displacement of the charging socket is possible by appropriately configuring the displacement device. For example, one of the spatial directions runs parallel to the longitudinal axis of the motor vehicle and another of the spatial directions is perpendicular to it. This enables a particularly flexible and reliable establishment of the conductive plug connection.

A further development provides that the protective ring is spring-loaded in the direction of the first position. The spring force is generated, for example, by means of a spring element which may act on the protective ring on the one hand and on the base body on the other hand. The spring force pushes the protective ring in the direction of the first position, in particular into the first position, provided that the protective ring is not influenced by external forces, for example by abutting the charging socket or the abutment ring. This ensures that the protective ring encompasses the electrical contacts again as quickly as possible after the charging plug has been removed from the charging socket, so that said electrical contacts are protected against external influences. Accordingly, the electrical contacts have a long service life.

A further development provides that the charging plug is connected via a flexible element to a base element which can be displaced by means of the lifting device, the flexible element allowing the charging plug to be flexibly tilted with respect to the base element at least temporarily. In this respect, the lifting device does not interact directly with the charging plug or the base body of the charging plug for its displacement, but is connected to the charging plug via the base element and the flexible element. Here, the lifting device directly effects a displacement of the base element, which in turn is connected to the charging plug via the flexible element.

The flexible element may be elastic and allows the charging plug to be tilted flexibly with respect to the base element at least temporarily. Tilting is understood to mean that a longitudinal central axis of the charging plug or of the base body, which normally coincides with a longitudinal central axis of the base element, is angled relative to the longitudinal central axis of the base element when it is tilted or after being tilted, that is to say it includes an angle different from 0° and 180°. Tolerance compensation is achieved by the flexibly tilting of the charging plug with respect to the charging element, so that the charging plug can always be reliably inserted into the charging socket in order to establish the conductive plug connection.

A further development provides that the flexible element is fixed in a retracted position of the base element and released in an extended position. The flexible tilting of the charging plug with respect to the base element is therefore only possible in the extended position of the base element, that is to say while the base element is displaced out of its retracted position in order to move the charging plug in the direction of the charging socket. For example, in the retracted position of the base element, the flexible element is encompassed by a tubular body which prevents said flexible tilting. In the extended position, however, the flexible element is arranged outside the tubular body and said flexible tilting is accordingly enabled.

It may be provided that the flexible element moves into the tubular body when the base element is displaced from the extended position to the retracted position and is thereby pushed from a possibly present tilted position in the direction of an untilted position, so that the charging plug with respect to the base element is aligned in an untilted manner by retracting the base element in the retracted position. As a result, the charging plug is reliably retracted.

A further development provides that the charging plug and the protective ring in the retracted position of the base element are flush with a base plate of the charging station. As already indicated above, the end faces or upper sides of the charging plug and the protective ring should be aligned with the base plate, so that the charging plug and the protective ring do not protrude beyond the base plate. This provides excellent protection for the charging plug and the protective ring.

A further development provides that the displacement device has a cleaning device for the charging plug. The displacement device, which enables the charging socket to be displaced translationally, additionally has the cleaning device which serves to clean the charging plug. For example, the cleaning device is configured as a cleaning brush or the like. The displacement device is not only provided and designed for the displacement of the charging socket, but also for the displacement of the cleaning device, for example the cleaning brush.

It can be provided that the displacement device first arranges the charging socket away from the charging plug, so that when the charging plug is extended in the direction of the motor vehicle, the charging plug does not enter the charging socket, but is arranged for cleaning by the cleaning device, for example abutting the cleaning device. In the latter case, the cleaning device may be displaced to clean the charging plug, for example moved back and forth at least once or even several times.

Then the charging socket is then brought into overlap with the charging plug by means of the displacement device and the charging plug is extended further until it engages the charging socket. It may be provided that the charging plug is retracted somewhat after cleaning by means of the cleaning device, namely only partially retracted, so that orienting the charging socket towards the charging plug by means of the displacement device is taking place without contact between the charging plug and the charging socket and/or the cleaning device. The charging plug is then extended again, namely until it engages the charging socket.

A further development provides that the contacts are in the form of energy transmission contacts, and the charging plug has signal transmission contacts in addition to the energy transmission contacts, the energy transmission contacts and the signal transmission contacts being arranged alternately over a circumference of the base body of the charging plug, and the energy transmission contacts having larger dimensions in the circumferential direction than the signal transmission contacts. The energy transmission contacts serve to transmit electrical energy with higher power than the signal transmission contacts. For example, the electrical power which can be transmitted by means of the energy transmission contacts is greater by a factor of at least 10, at least 100 or at least 1000 than the electrical power which can be transmitted by means of the signal transmission contacts.

The conductive plug connection for supplying the motor vehicle with electrical energy may be established via the energy transmission contacts, that is to say ultimately the electrical connection between the charging station and/or the energy source, on the one hand, and the energy consumer of the motor vehicle, on the other hand. The signal transmission contacts, on the other hand, may only serve to determine a properly established conductive plug connection and/or to establish data transmission between the energy supply arrangement and the motor vehicle, for example by means of pulse width modulation or powerline communication. It may be provided that the energy transmission contacts are completely electrically separated from the energy source until the signal transmission contacts indicate the proper establishment of the conductive plug connection. Only then the electrical connection is established between the energy transmission contacts and the energy source, so that the motor vehicle or the energy consumer is supplied with electrical energy via the energy transmission contacts.

In any case, the energy transmission contacts and the signal transmission contacts are spaced apart in the circumferential direction in such a way that sufficient dielectric strength is ensured and creepage distances between the contacts are avoided. The energy transmission contacts have larger dimensions in the circumferential direction than the signal transmission contacts. Additionally or alternatively, they also have larger dimensions in the axial direction than the signal transmission contacts. With such a configuration of the energy transmission contacts and the signal transmission contacts, it is ensured that the energy transmission via the energy transmission contacts is reliably possible as soon as the signal transmission contacts indicate the proper establishment of the conductive plug connection.

According to the above statements, the charging socket has counter contacts for the contacts of the charging plug. The counter contacts interacting with the energy transmission contacts are referred to as energy transmission counter contacts and the counter contacts interacting with the signal transmission contacts are referred to as signal transmission counter contacts. The energy transmission counter contacts may have dimensions in the circumferential direction which differ from the dimensions of the energy transmission contacts in the same direction.

The dimensions of the energy transmission contacts may be larger in the circumferential direction by at least 50%, at least 75% or at least 100% than the dimensions of the energy transmission counter contacts, or vice versa. The dimensions of the signal transmission contacts in the circumferential direction are, for example, at least 100%, at least 150%, at least 200% or at least 250% larger than the dimensions of the signal transmission counter contacts in the same direction, or vice versa. In this way a good angular tolerance is achieved.

Additionally or alternatively, a ratio between the dimensions of the signal transmission counter contacts and the dimensions of the signal transmission contacts is greater than the ratio between the dimensions of the energy transmission contacts and the dimensions of the energy transmission counter contacts, in each case in the circumferential direction and/or in the axial direction. With such a configuration, the proper establishment of the conductive plug connection is only recognized as such by means of the signal transmission contacts when it can be reliably assumed that there is a reliable conductive connection between the energy transmission contacts and the energy transmission counter contacts.

A further development provides that the charging plug and/or the charging socket can be rotated by means of a rotary drive. By means of the rotary drive, angular deviations between the charging plug and the charging socket can be easily compensated. For example, the charging plug or the charging socket is rotated by means of the rotary drive until the presence of the conductive plug connection is recognized as such, using the signal transmission contacts. Only then the energy transfer contacts are electrically connected to the energy source.

Embodiments of the invention further relate to a method for operating an energy supply arrangement for supplying a motor vehicle with electrical energy via a conductive plug connection, in particular an energy supply arrangement according to the statements in the context of this description, wherein the energy supply arrangement has a stationary charging station and a charging socket, which is arranged on board the motor vehicle, the charging station having a charging plug which can be extended in the direction of the motor vehicle. In this case it is provided that the charging plug has a cylindrical base body, on the lateral surface of which multiple electrical contacts are arranged, the base body being encompassed by a protective ring which covers the contacts in a first position and releases the contacts in a second position for contacting counter contacts of the charging socket.

The advantages of such a configuration of the energy supply arrangement or of such an approach have already been pointed out. Both the energy supply arrangement and the method for operating it can be further developed in accordance with the statements in the context of this description, so that reference is made to such further developments.

BRIEF DESCRIPTION OF THE SEVERAL VIEWS OF THE DRAWINGS

Embodiments of the invention are explained in more detail below with reference to the drawings.

DETAILED DESCRIPTION

Figure 1:
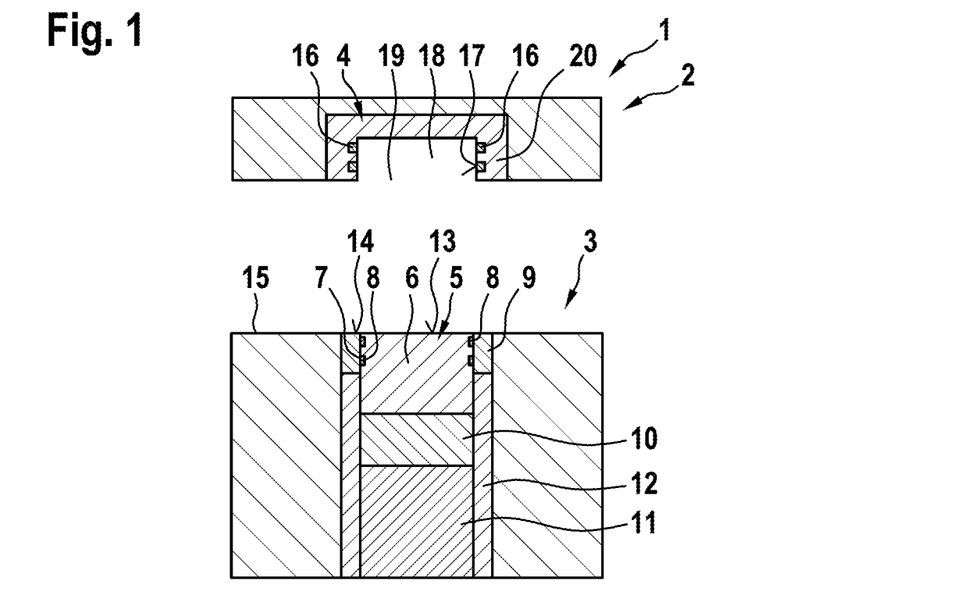
FIG. 1 shows a schematic sectional view of an energy supply arrangement, wherein a charging plug is arranged in a first position.

FIG. 1 shows a schematic sectional view of an energy supply arrangement 1 for supplying a motor vehicle 2 with electrical energy via a conductive plug connection. The energy supply arrangement 1 has a stationary charging station 3 and a charging socket 4, which is arranged on board of motor vehicle 2. The charging station 3 has a charging plug 5 which can be extended in the direction of the motor vehicle 2 or the charging socket 4. The charging plug 5 has a cylindrical base body 6, on the lateral surface 7 of which multiple electrical contacts 8 are arranged. The base body 6 is at least temporarily encompassed by a protective ring 9 such that the contacts 8 are covered by the protective ring 9.

The charging plug 5 is, via a flexible element 10, connected to a base element 11 which can be displaced in the vertical direction, that is to say in the direction of the motor vehicle 2, by means of a lifting device (not shown here). The flexible element 10 is arranged in a tubular body 12 at least in the first position of the charging plug 5 shown here, as a result of which a flexible tilting of the charging plug 5 with respect to the base element 11 is prevented. In the illustrated first position of the charging plug 5, an end face 13 of the base body 6 and an end face 14 of the protective ring 9 are flush with a base plate 15 of the charging station 3, namely in such a way that the charging plug 5 and the protective ring 9 do not protrude beyond them. In this respect, the charging plug 5 in its first position is excellently protected against external influences.

The charging socket 4 has multiple counter contacts 16 for establishing an electrical connection between the charging plug 5 and the charging socket 4. These counter contacts are arranged in a cylindrical lateral surface 17, which delimits a plug receptacle 18 in the radial direction. The plug receptacle 18 is encompassed by an abutment ring 20 at least on its side having an orifice 19, said abutment ring being provided and designed for displacing the protective ring 9 with respect to the base body 6.

Figure 2:
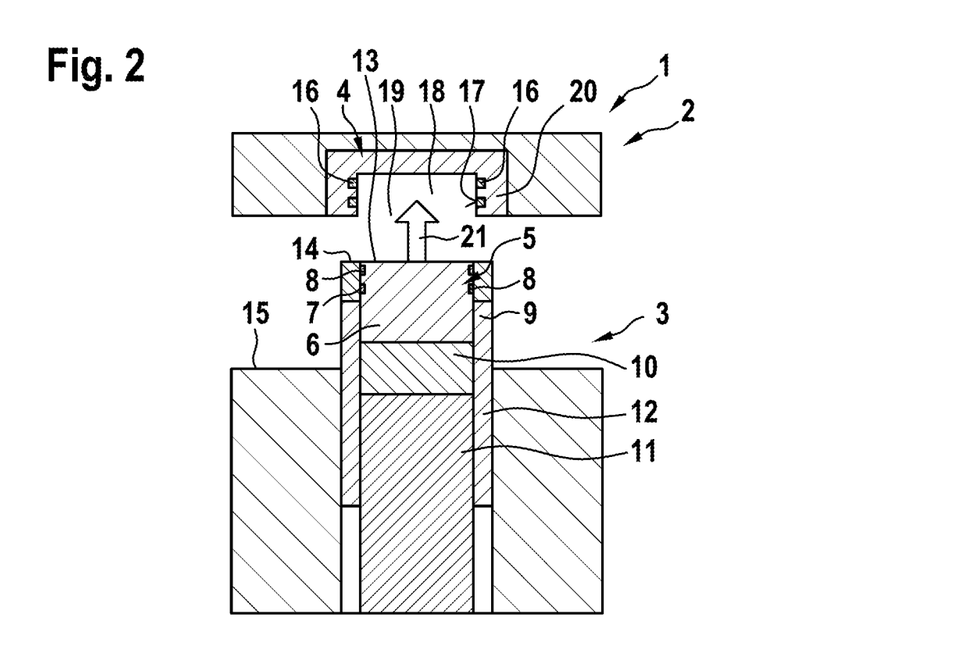
FIG. 2 shows a schematic sectional view of the energy supply arrangement, wherein the charging plug is arranged in a second position.

FIG. 2 shows the energy supply arrangement 1 in a schematic illustration in a second position of the charging plug 5. In said second position, the charging plug 5 has been displaced in the direction of the arrow 21 in the direction of the motor vehicle 2 or the charging socket 4. It is evident that the protective ring 9 continues to encompass the contacts 8 and that the tubular body 12 continues to receive the flexible element 10.

Figure 3:
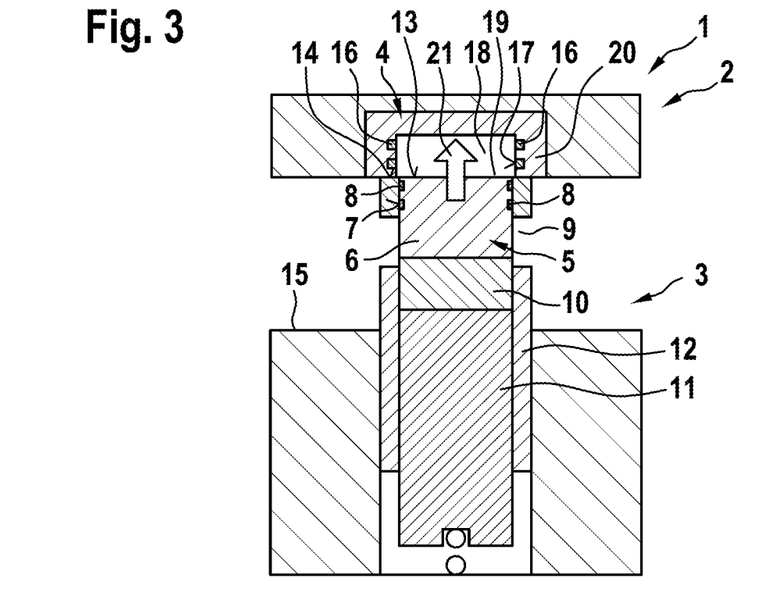
FIG. 3 shows a schematic illustration of the energy supply arrangement, wherein the charging plug is arranged in a third position.

FIG. 3 again shows the energy supply arrangement 1 schematically, the charging plug 5 being arranged in a third position. In said third position, the protective ring 9 continues to encompass the contacts 8, but abuts the abutment ring 20. The flexible element 10 is partially arranged outside the tubular body 12.

Figure 4:
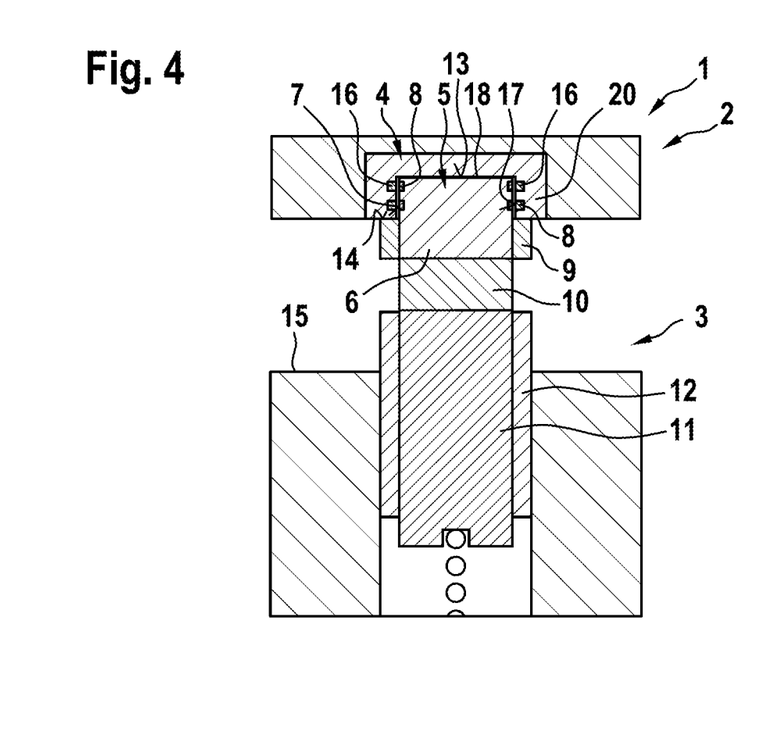
FIG. 4 shows a schematic sectional view of the energy supply arrangement, wherein the charging plug is arranged in a fourth position.

FIG. 4 shows a schematic illustration of the energy supply arrangement 1 when the charging plug 5 is arranged in a fourth position. Compared to the third position, the charging plug 5 has been displaced further in the direction of the motor vehicle 2, so that the protective ring 9 is pushed by the contact ring 20 into a second position, in which it is present away from the electrical contacts 8, that is to say, it releases them. In the fourth position, the charging plug 5 is arranged completely in the charging socket 4 or the plug receptacle 18, namely in such a way that the contacts 8 are in an electrically conductive connection to the counter contacts 16. The flexible element 10 is now arranged outside the tubular body 12, so that the flexible element 10 enables the charging plug 5 to tilt with respect to the base element 11 providing tolerance compensation.

Figure 5:
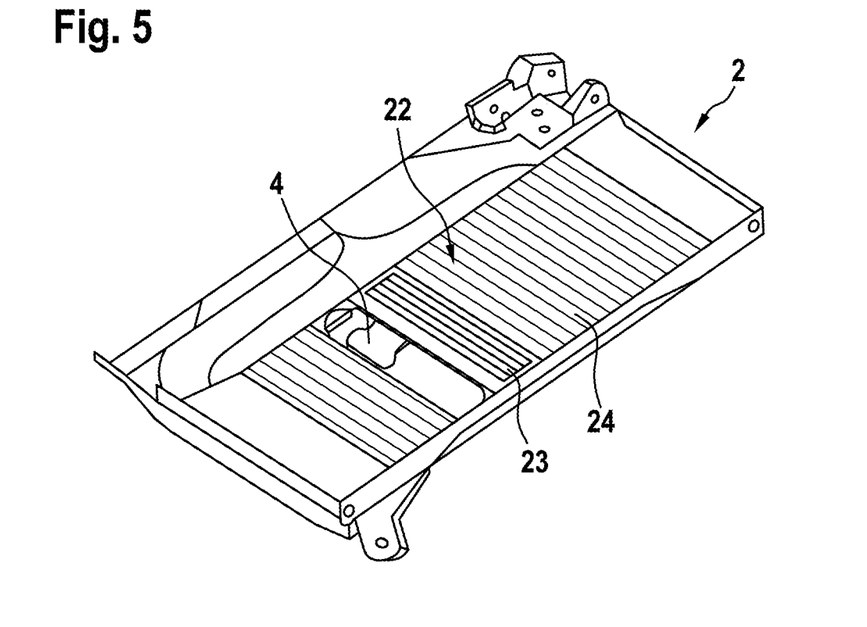
FIG. 5 shows a schematic illustration of an area of a motor vehicle with a charging socket of the energy supply arrangement.

FIG. 5 shows a schematic illustration of an area of the motor vehicle 2, namely an underbody of the motor vehicle 2. The charging socket 4 is present on said underbody, which charging socket can be displaced translationally by means of a displacement device 22. The displacement device 22 may enable the charging socket 4 to be displaced in two mutually perpendicular spatial directions in an imaginary plane arranged parallel to the underbody of the motor vehicle 2. The displacement device 22 also may have a receptacle for the charging socket 4, in which the charging socket 4 is arranged if it is not required for establishing the conductive plug connection with the charging plug 5. In the receptacle, it is protected against external influences from the outside environment.

The displacement device 22 has a cleaning device 23 for cleaning the charging plug 5. The cleaning device 23 is configured, for example, in the manner of a cleaning brush. The displacement device 22 may have a belt conveyor 24, by means of which the charging socket 4 can be displaced in at least one of the spatial directions, such as parallel to a longitudinal axis of the motor vehicle 2. In the lateral direction, that is to say perpendicular to the longitudinal axis of the motor vehicle 2, the charging socket 4 can be displaced by means of a carriage (not shown in more detail) of the displacement device 22.

Figure 6:
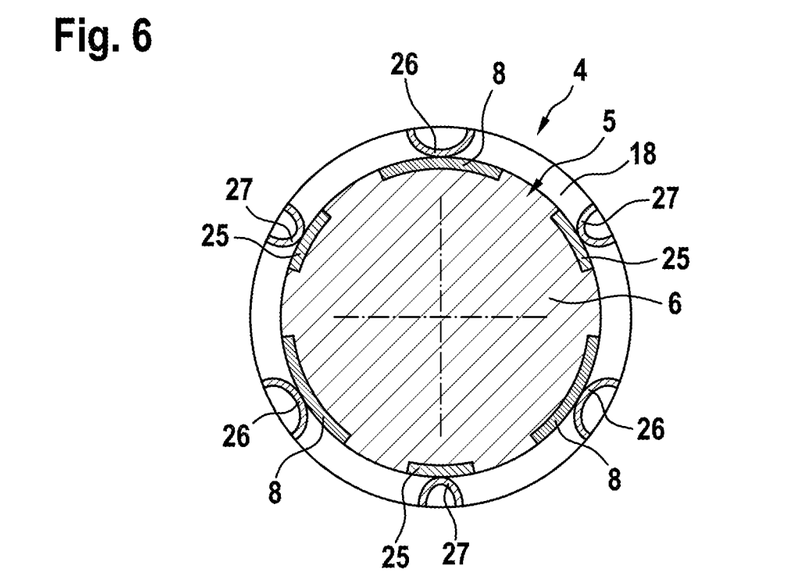
FIG. 6 shows a schematic sectional view of the charging plug arranged in the charging socket.

FIG. 6 shows a sectional view of the charging plug 5 arranged in the charging socket 4. The contacts 8 of the charging plug 5 are in the form of energy transmission contacts. In addition to said energy transmission contacts, the charging plug 5 has signal transmission contacts 25. Each of the energy transmission contacts 8 is assigned an energy transmission counter contact 26 of the charging socket 4. Analogously, each of the signal transmission contacts 25 is assigned a signal transmission counter contact 27 of the charging socket 4. It can be seen that the energy transmission contacts 8 have larger dimensions in the circumferential direction than the signal transmission contacts 25. In addition, the energy transmission contacts 8 may have larger dimensions in the circumferential direction than the energy transmission counter contacts 26. Additionally, or alternatively, the dimensions of the signal transmission contacts 25 in the circumferential direction are larger than those of the signal transmission counter contacts 27. In this way an angular tolerance is achieved.

The signal transmission contacts 25 are used in conjunction with the signal transmission counter contacts 27 in order to recognize a proper establishment of the conductive plug connection. As soon as it has been determined by means of the signal transmission contacts 25 and the signal transmission counter contacts 27 that such conductive plug connection is present, a transmission of electrical energy is initiated via the energy transmission contacts 8 and the energy transmission counter contacts 26. For this purpose, for example, the signal transmission contacts 8 are only connected to an energy source via the charging station 3 from this point in time.

The described configuration of the energy supply unit 1 has the advantage that a reliable establishment of the conductive plug connection is always possible, and that contamination or damage to the contacts 8 due to external influences is reliably avoided.

German patent application no. 10 2019 125 783.2, filed Sep. 25, 2019, to which this application claims priority, is hereby incorporated herein by reference in its entirety.

Aspects and features of the various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. An energy supply arrangement for supplying a motor vehicle with electrical energy via a conductive plug connection, comprising:
a stationary charging station; and
a charging socket arranged on board the motor vehicle;
wherein the charging station has a charging plug which is extendable in the direction of the motor vehicle;
wherein the charging plug has a cylindrical base body, on the lateral surface of which multiple electrical contacts are arranged, the base body being encompassed by a protective ring which covers the contacts in a first position and releases the contacts in a second position for contacting counter contacts of the charging socket; and
wherein the contacts are in the form of energy transmission contacts and the charging plug has signal transmission contacts in addition to the energy transmission contacts, the energy transmission contacts and the signal transmission contacts being arranged alternately over a circumference of the base body of the charging plug, and the energy transmission contacts having larger dimensions in a circumferential direction than the signal transmission contacts.

2. The energy supply arrangement according to claim 1, wherein the charging plug can be displaced translationally only in the vertical direction by a lifting device.

3. The energy supply arrangement according to claim 1, wherein the charging socket can be translationally displaced in at least one spatial direction parallel to an underbody of the motor vehicle by a displacement device.

4. The energy supply arrangement according to claim 1, wherein the protective ring is spring-loaded in the direction of the first position.

5. The energy supply arrangement according to claim 1, wherein the charging plug is connected to a base element which can be displaced by a lifting device, via a flexible element, the flexible element allowing the charging plug to tilt flexibly with respect to the base element at least temporarily.

6. The energy supply arrangement according to claim 5, wherein the flexible element is fixed in a retracted position of the base element and is released in an extended position.

7. The energy supply arrangement according to claim 6, wherein the charging plug and the protective ring are flush with a base plate of the charging station in the retracted position of the base element.

8. The energy supply arrangement according to claim 1, wherein the charging plug and/or the charging socket can be rotated by a rotary drive.

9. A method, comprising:
providing a charging plug which can be extended in a direction of a motor vehicle, wherein the charging plug has a cylindrical base body, on the lateral surface of which multiple electrical contacts are arranged, the base body being encompassed by a protective ring which covers the contacts in a first position and releases the contacts in a second position for contacting counter contacts of a charging socket arranged on board the motor vehicle, wherein the contacts are in the form of energy transmission contacts and the charging plug has signal transmission contacts in addition to the energy transmission contacts, the energy transmission contacts and the signal transmission contacts being arranged alternately over a circumference of the base body of the charging plug, and the energy transmission contacts having larger dimensions in a circumferential direction than the signal transmission contacts, and wherein the charging plug is connected to a base element which can be displaced by a lifting device, via an elastic element, the elastic element allowing the charging plug to tilt flexibly with respect to the base element at least temporarily; and
supplying the motor vehicle with electrical energy via a conductive plug connection of the charging plug.

* * * * *